SIGNALLING SYSTEM WITH UPPER AND LOWER CASE DESIGNATIONS

Filed Feb. 27, 1967

INVENTORS.
WILLIAM F. BARTLETT
RICHARD SCOTT
UNO RANDMERE
BARRIE BRIGHTMAN
BY
ATTORNEY

United States Patent Office 3,526,892
Patented Sept. 1, 1970

3,526,892

SIGNALLING SYSTEM WITH UPPER AND LOWER CASE DESIGNATIONS

William F. Bartlett, Rochester, Barrie Brightman, Webster, Uno Randmere, Rochester, and Richard Scott, Pittsford, N.Y., assignors to Stromberg Carlson Corporation, Rochester, N.Y., a corporation of Delaware Filed Feb. 27, 1967, Ser. No. 618,870
Int. Cl. H04l 5/00, 15/04
U.S. Cl. 340—365 1 Claim

ABSTRACT OF THE DISCLOSURE

A signalling system for remote operation of a calculator which requires twenty-two distinguishable input signals. A standard twelve-key key set is used at the local station. One key is designated a shift key, and the central office equipment is arranged to direct the signal next following actuation of the shift key to a different input of the calculator from the one to which it would otherwise be directed.

This invention relates to a novel arrangement for signalling responsively to coded signals such as pulse signals of the multifrequency type, and, more particularly, to a novel arrangement of this kind whereby a greater number of different output signals can be produced than there are code conditions available for the input signals.

The invention arose in connection with the development of a system providing access to a calculator, or other data processing equipment through ordinary telephone lines. It was desired to provide access to the calculator without the need of placing a full calculator keyboard at each local telephone station, but instead to enable the station to transmit all the necessary instructions simply by operating a standard key set of the so-called touch-tone type. Key sets of this type are commercially available in standard 10-key, 12-key, and 16-key configurations. The calculator actually used had, however, twenty-two different inputs, each of which was represented by a separate key on its keyboard. The problem was, in effect, to substitute a standard commercial telephone key set for the calculator keyboard without sacrificing any performance capability of the calculator.

Although the invention will be described herein in connection with a relatively simple embodiment thereof, in which only twenty-two different input signals are available for the calculators, or central processor, it will be apparent that by obvious modification, the number of input signals may be substantially increased. Briefly, in accordance with the invention, one or more of the keys of a standard telephone key set is designated as a shift key, and equipment is provided at a switching station between the key set and the calculator responsive to actuation of the designated key for steering the next succeeding signal from the key set to a different input of the calculator from the one to which it would otherwise be directed. The switching equipment re-sets itself immediately thereafter to the normal condition. The operation is analogous to the operation of the shift key of a standard typewriter.

Figure 1:
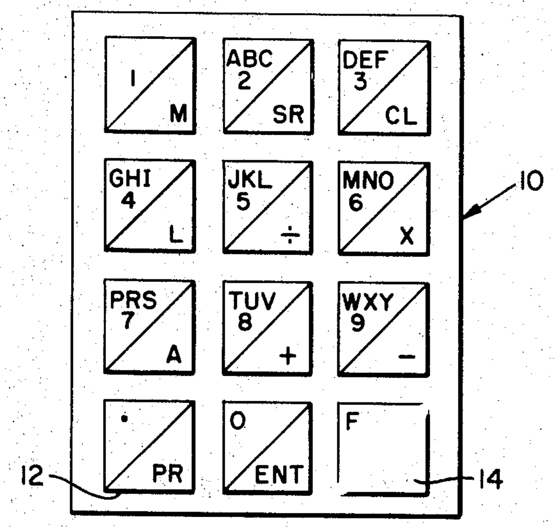
Figure 2:
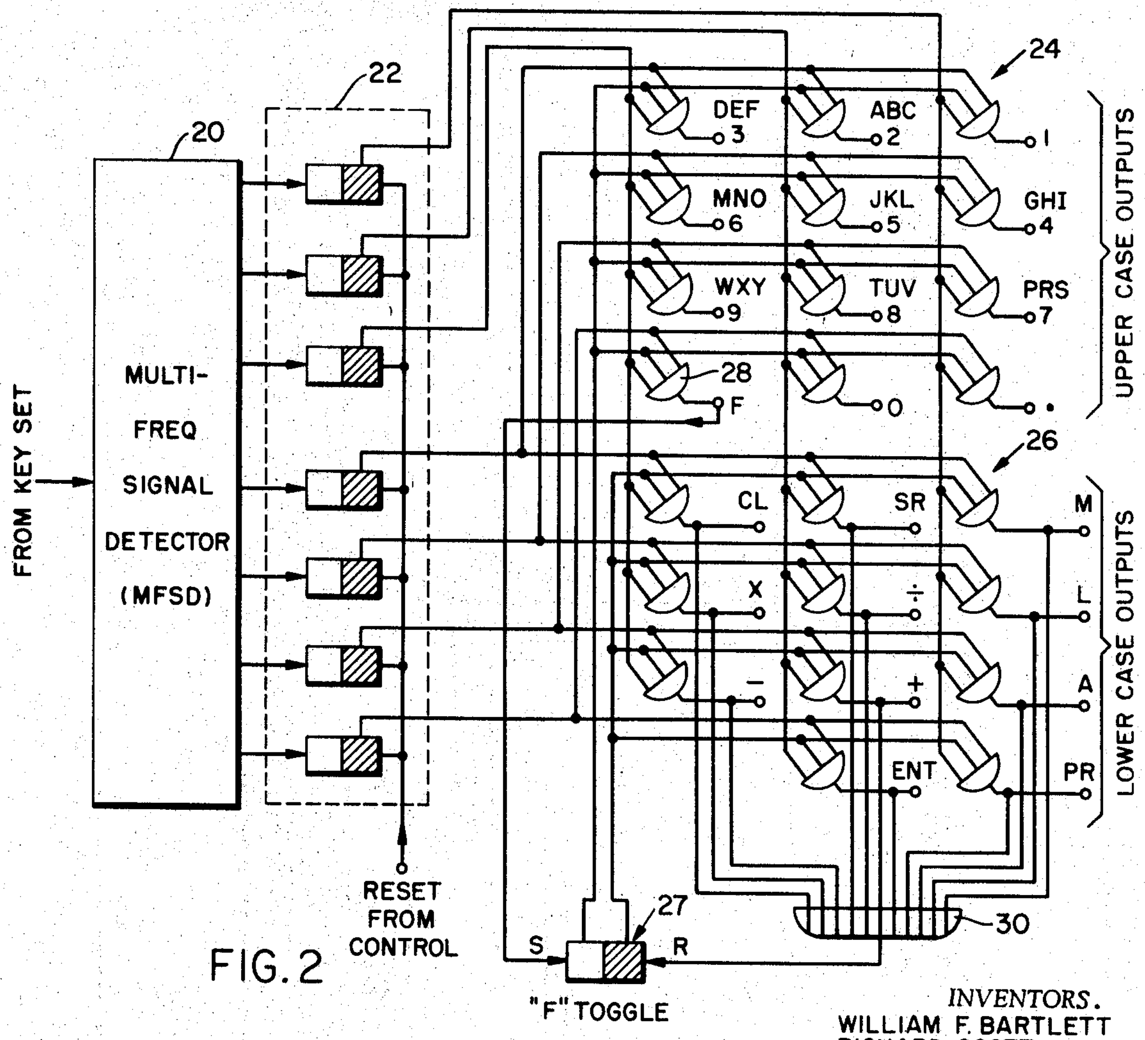

A representative embodiment of the invention will now be described in detail, in connection with the accompanying drawing, wherein:

FIG. 1 is a schematic plan view of a multi-frequency telephone key set carrying indicia in accordance with the invention; and FIG. 2 is a schematic circuit diagram of switching equipment for use in the practice of the invention.

Referring now to the drawing, a 12-key telephone key set 10 is shown in FIG. 1. The key set 10 is commercially standard in every respect except for the indicia on the keys. Each key except one carries two separate designations, one for upper case and one for lower case. The upper case designations are standard telephone indicia representing numerical digits and three-letter groups of alphabetical letters. In addition, the key 12 in the lower lefthand corner of the set carries an upper case designation of a decimal point. The lower case designations represent instructions for the calculator or data processor such as, for example, add, subtract, multiply, divide, enter, clear, start-reset, print, manual, learn, and automatic. Their arrangement will depend upon the particular calculator or data processor used in the system. The lower righthand key 14, as shown, carries only a single indicia, which may be represented by the letter F. This is the function, or shift key.

The apparatus is set up to operate normally in its upper register mode, so that for all of the keys except the shift key 14, the user of the equipment will read the upper case designations. When it is desired to transmit an instruction indicated by a lower case designation, the user first depresses the shift key 14, which instructs the switching equipment to recognize the next signal as a lower case signal. Then the desired instruction may be transmitted, after which the switching equipment automatically switches back to upper case. Lower case reception at the switching equipment is effective for only one input following actuation of the shift key 14, and each lower case input must be preceded by actuation of the shift key 14. In the arrangement shown, therefore, 22 different input signals may be derived from the standard 12-key set.

FIG. 2 illustrates, in simplified form, a toggle circuit for switching from upper case to lower case operation and back again in the manner hereinabove described. A multifrequency signal detector 20, which may be of any desired type, detects the output of the key set 10 and sets the appropriate flip-flops in an X–Y register 22. The outputs of the register 22 are directed to matrices 24 and 26 of AND gates, the outputs of which constitute the inputs to the calculator (not shown) and to a toggle flip-flop 27. With the toggle flip-flop 27 in its normal, or re-set condition, all of the gates in the upper case matrix 24 are partially enabled and all of the gates in the lower case matrix 26 are maintained disabled. When the toggle flip-flop 27 becomes set, it disables all of the gates in the upper case matrix 24 and partially enables all of the gates in the lower case matrix 26. The toggle flip-flop 27 is set by the output of the gate 28 in the upper case matrix 24 that responds to actuation of the shift key 14. The outputs of all of the gates in the lower case matrix 26 are fed not only to the calculator but also to an OR gate 30, the output of which re-sets the toggle flip-flop.

In the embodiment shown, the lower case matrix 26 does not include a gate responsive to the shift key 14, and, therefore, successive re-actuations of the shift key 14 have no effect on the equipment. If desired, a lower case gate may be provided to produce an output signal responsively to re-actuation of the shift key 14, in which case successive re-actuations of the shift key 14 will be effective to shift the circuit back and forth between the upper case and lower case modes of operation. In such case, the shift key 14 may also be used as a dual designation key to signal an instruction to the calculator through the lower case matrix 26.

It will be apparent that the principle of the invention may readily be extended to any desired degree of complexity by providing additional registers and designating additional keys as auxiliary shift keys. While such arrangements may be found to be advantageous for certain purposes, it is presently thought that they are apt to be confusing to operate, and that the particular arrangement described herein will be found to be fully adequate for most utilizations.

What is claimed is:

1. Electronic signalling apparatus for producing plural separately identifiable output signals responsively to time-spaced coded input signals, the number of output signals being greater than the number of different code conditions in the input signal code, said apparatus comprising first and second sets of output terminals, means for producing output signals responsively to the coded input signals, means for normally applying output signals so produced to said first set of terminals, and switching means responsive to an input signal indicating a preselected code condition for disabling said normally applying means and directing the next succeeding input signal to said second set of terminals, said switching means including toggle means responsive to said next succeeding input signal for reenabling said normally applying means.

References Cited

UNITED STATES PATENTS

| | | | |
|---|---|---|---|
| 3,104,388 | 9/1963 | Balenger | 178—17 |
| 3,369,643 | 2/1968 | Avgerinos et al. | 178—17 |

THOMAS A. ROBINSON, Primary Examiner

U.S. Cl. X.R.

178—17; 179—2; 197—98; 235—61